O. S. JEFFRIES, Sr.
VARIABLE SPEED MECHANISM.
APPLICATION FILED MAR. 8, 1919.
1,337,602.
Patented Apr. 20, 1920.
10 SHEETS—SHEET 1.
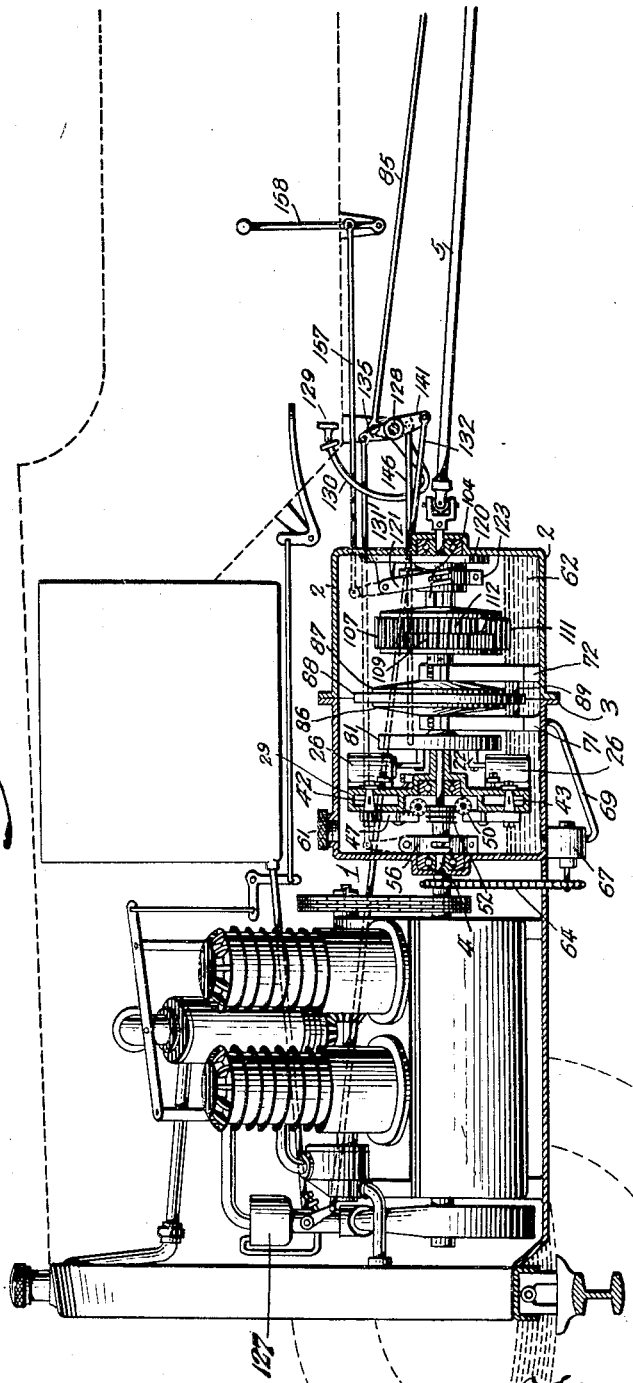
INVENTOR
Oscar S. Jeffries Sr.
BY
ATTORNEYS

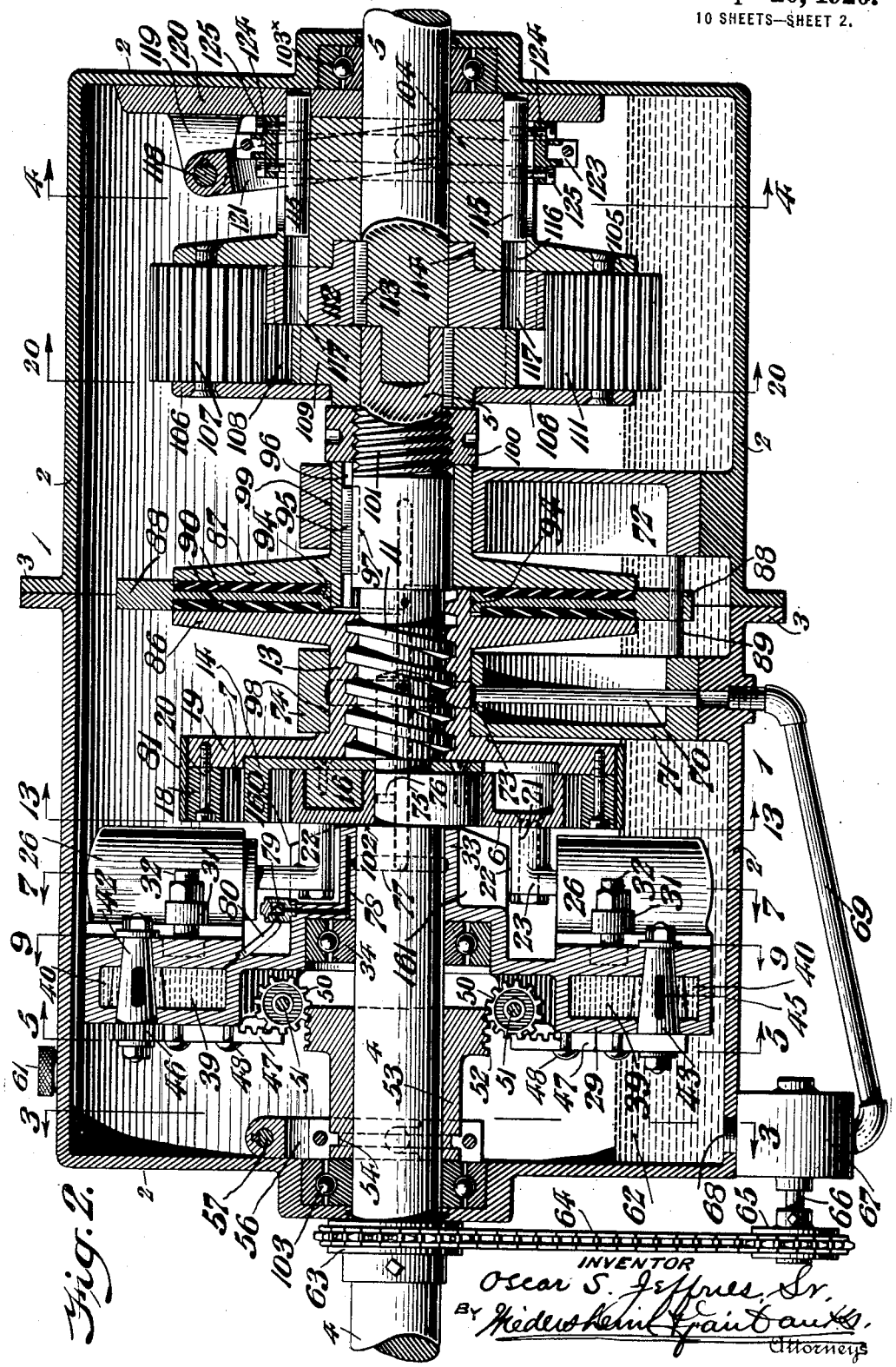

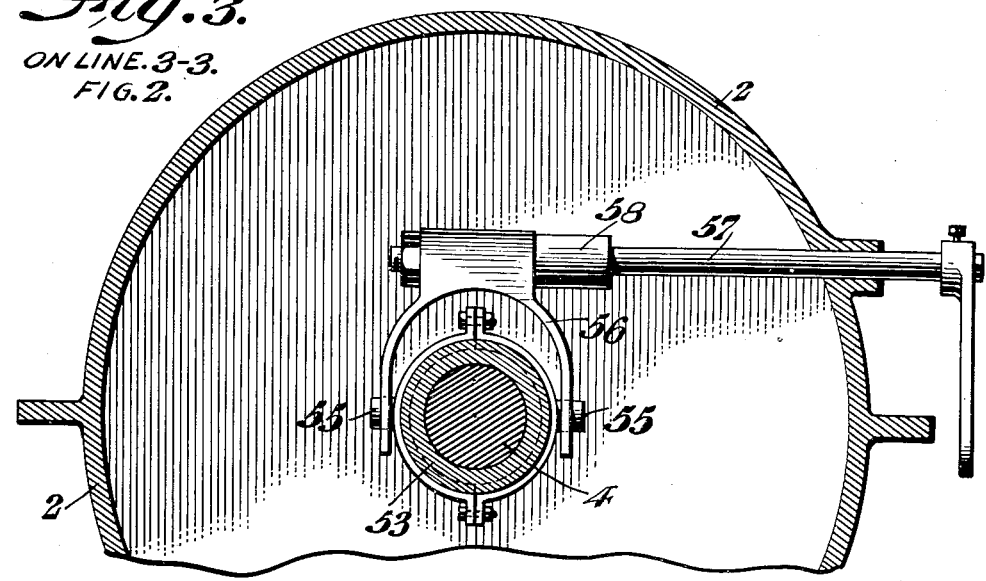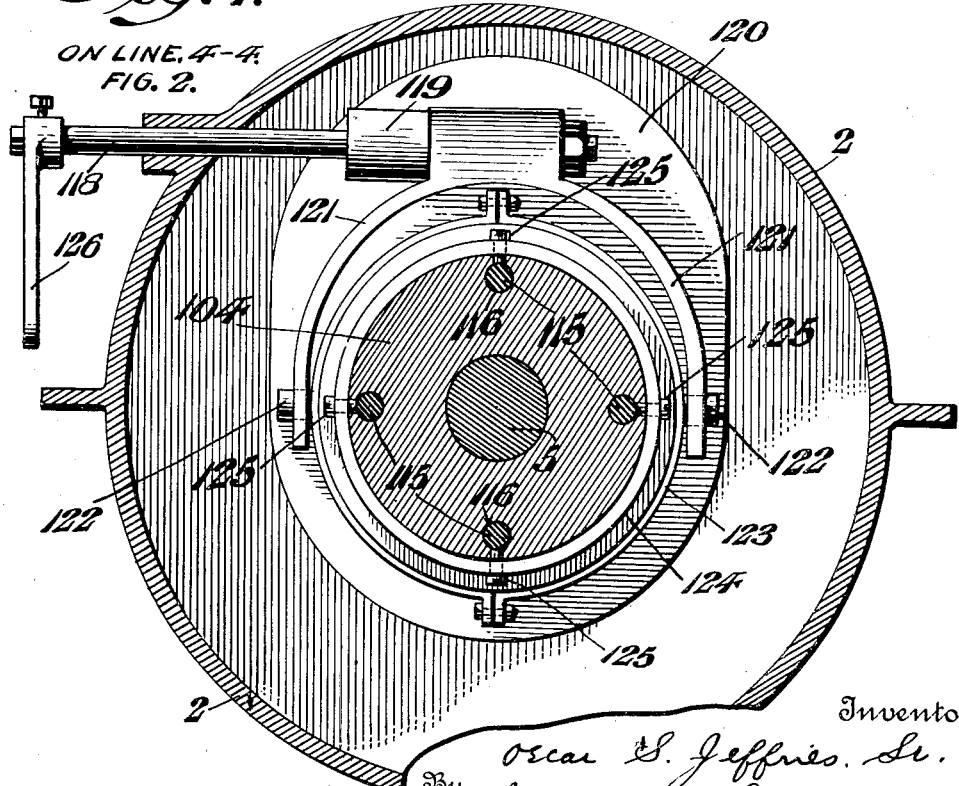

O. S. JEFFRIES, Sr.
VARIABLE SPEED MECHANISM.
APPLICATION FILED MAR. 8, 1919.
1,337,602.
Patented Apr. 20, 1920.
10 SHEETS—SHEET 4.
Fig. 5.
ON LINE. 5-5.
FIG. 2.
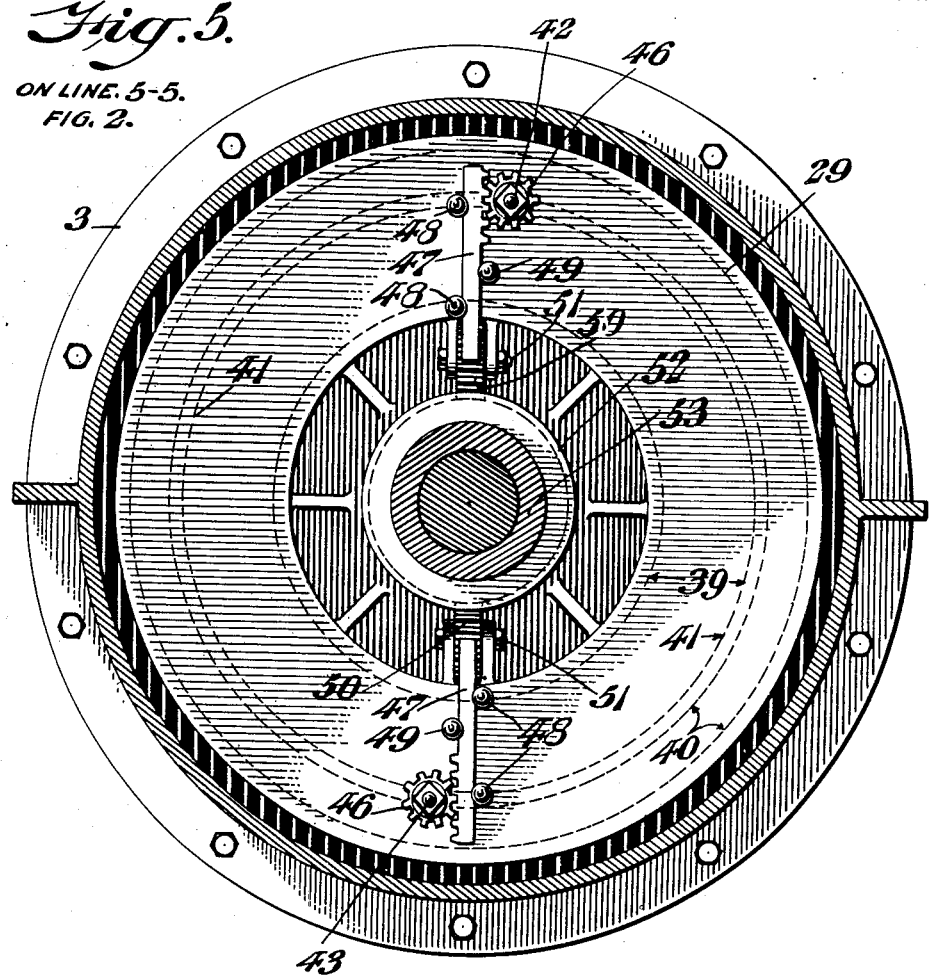
Fig. 6.
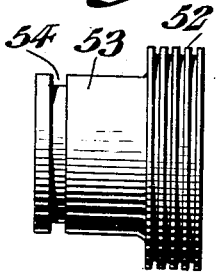
INVENTOR
Oscar S. Jeffries, Sr.
BY
Thedersheim Fairbanks
ATTORNEYS O. S. JEFFRIES, Sr.
VARIABLE SPEED MECHANISM.
APPLICATION FILED MAR. 8, 1919.

1,337,602.

Patented Apr. 20, 1920.
10 SHEETS—SHEET 5.

ON LINE. 7-7. FIG. 2.

ON LINE. 8-8. FIG. 7.

INVENTOR
Oscar S. Jeffries, Sr.
BY Niedersheim Fairbanks
ATTORNEYS

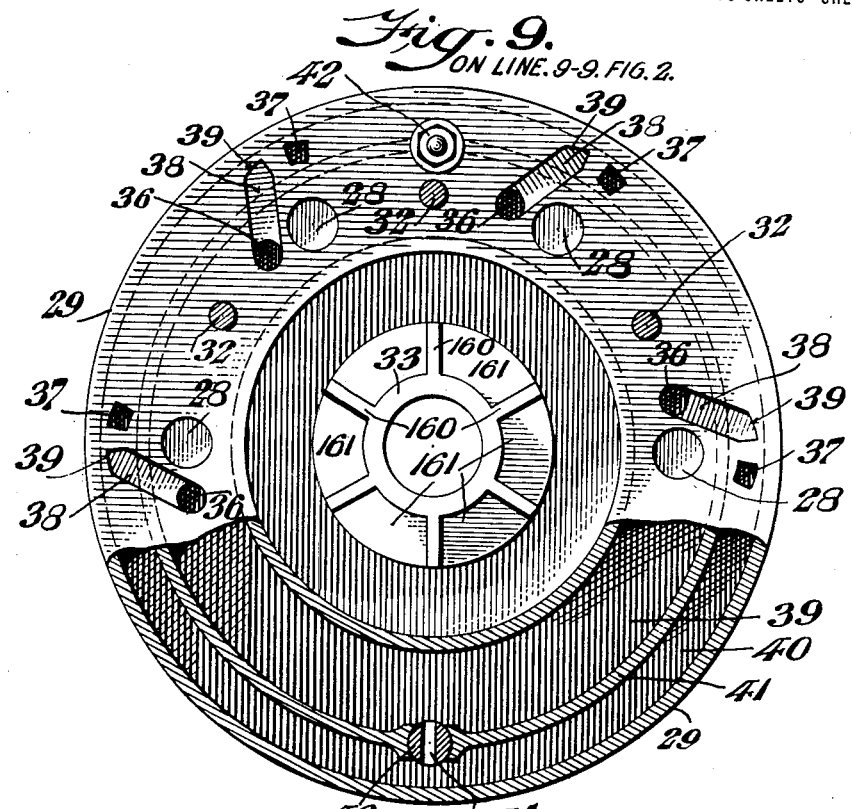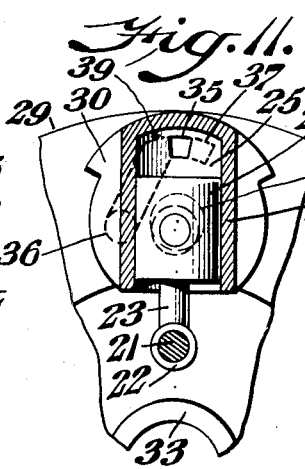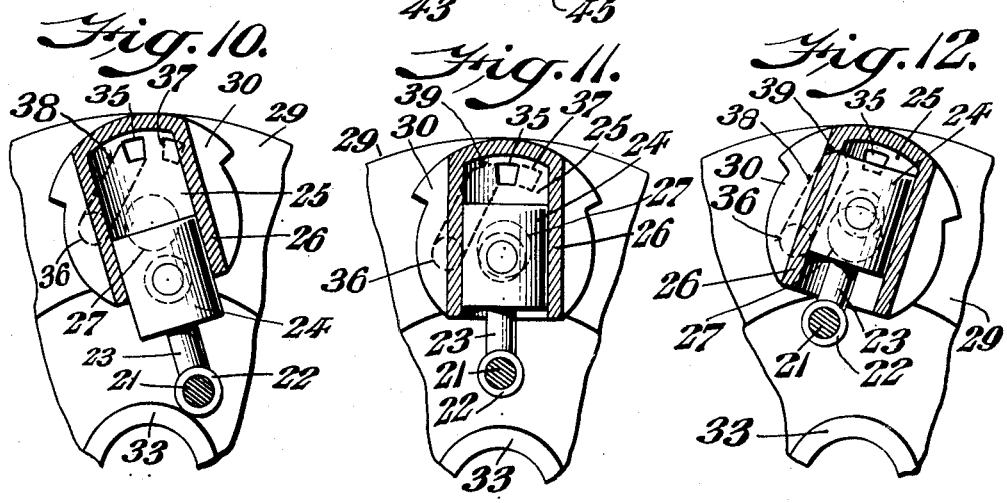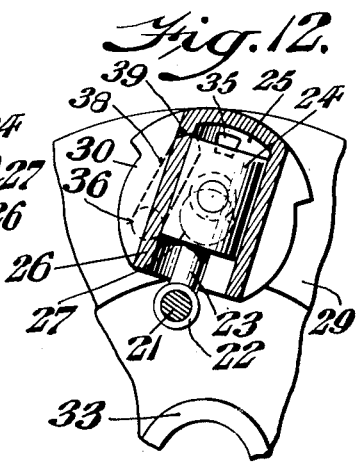

O. S. JEFFRIES, Sr.
VARIABLE SPEED MECHANISM.
APPLICATION FILED MAR. 8, 1919.
1,337,602.
Patented Apr. 20, 1920.
10 SHEETS—SHEET 7.
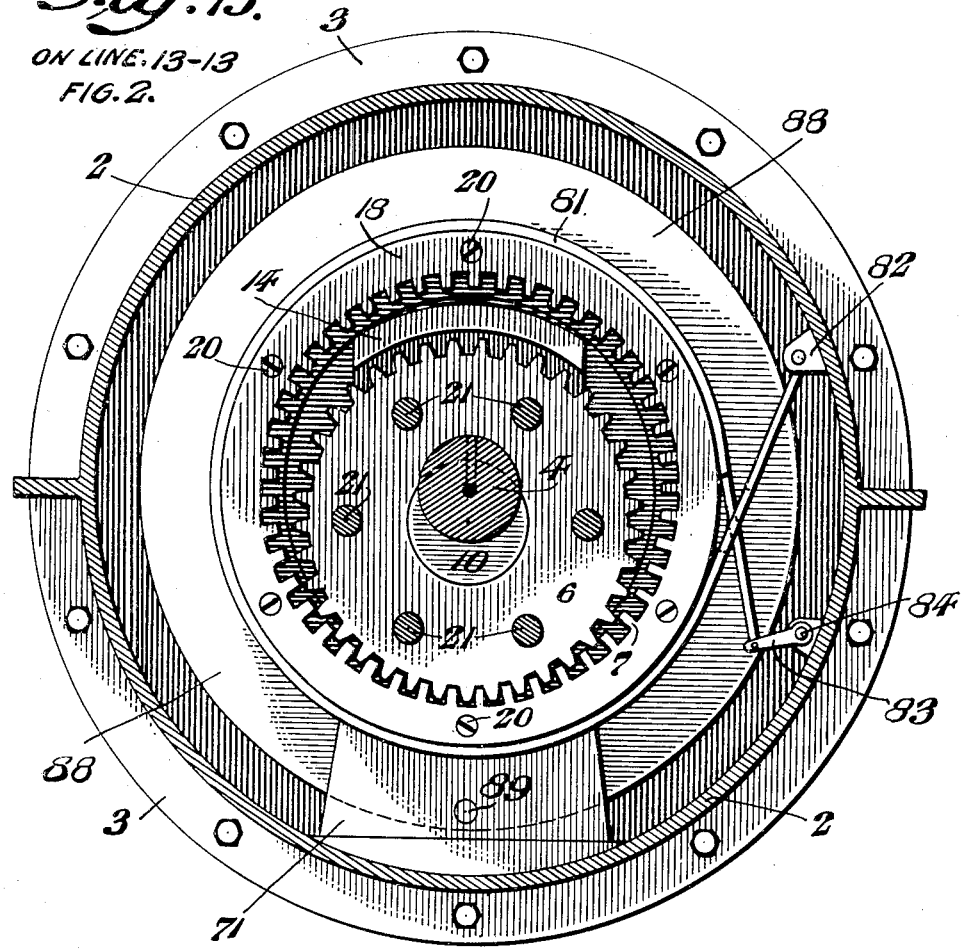
Fig. 13.
ON LINE 13-13
FIG. 2.
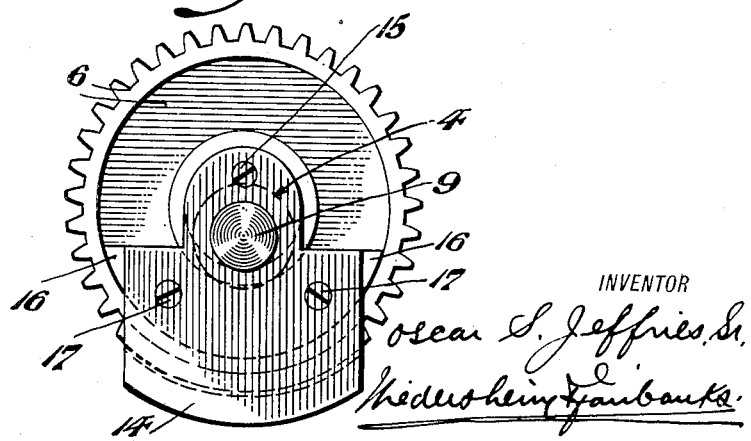
Fig. 14.
INVENTOR
Oscar S. Jeffries, Sr.
ATTORNEYS

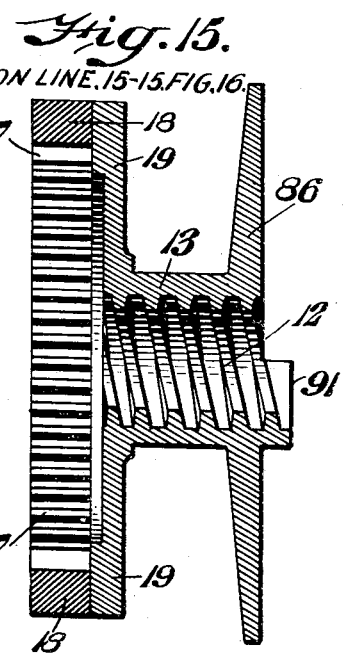
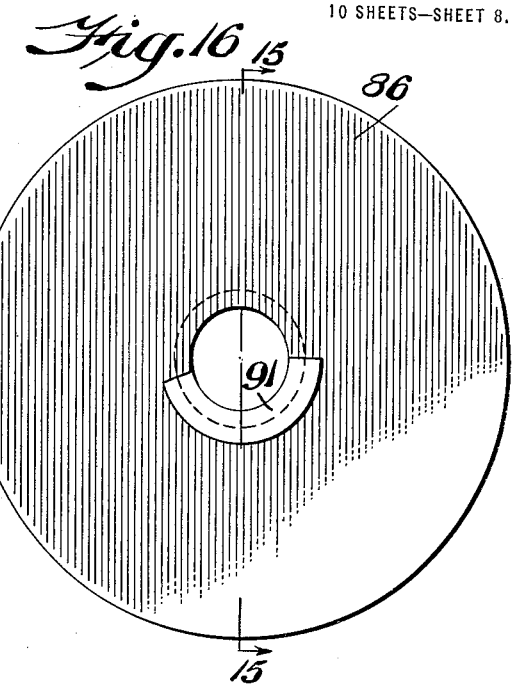
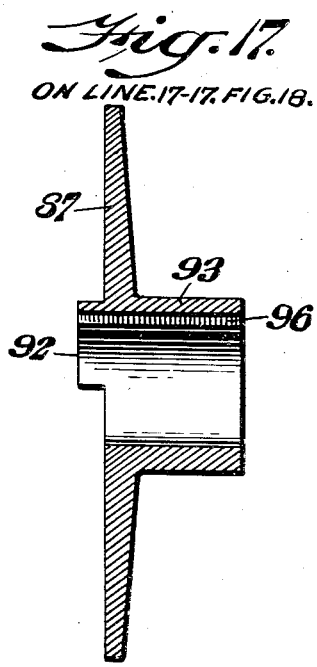
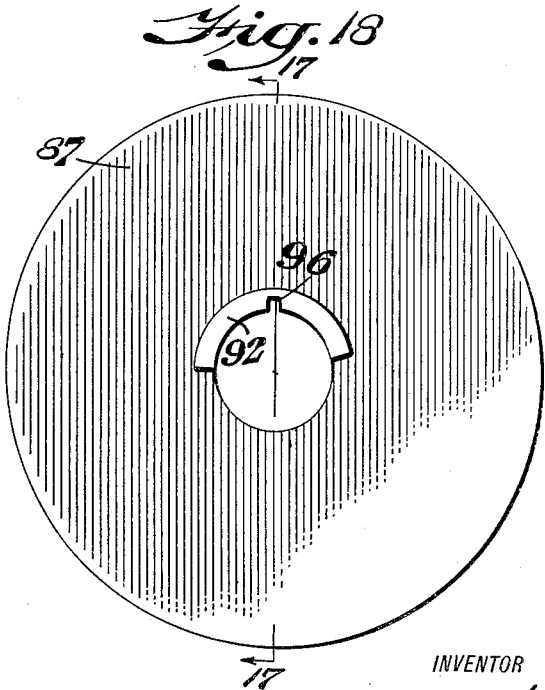

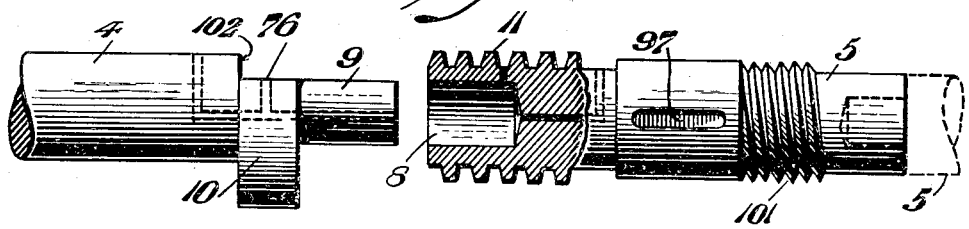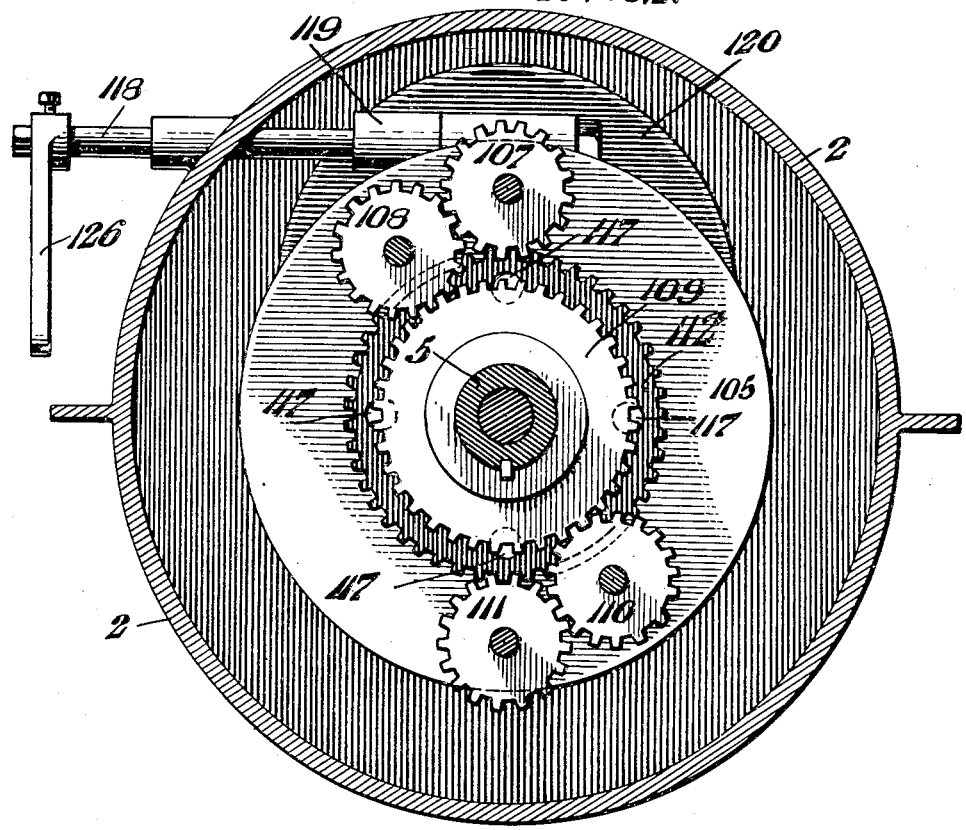

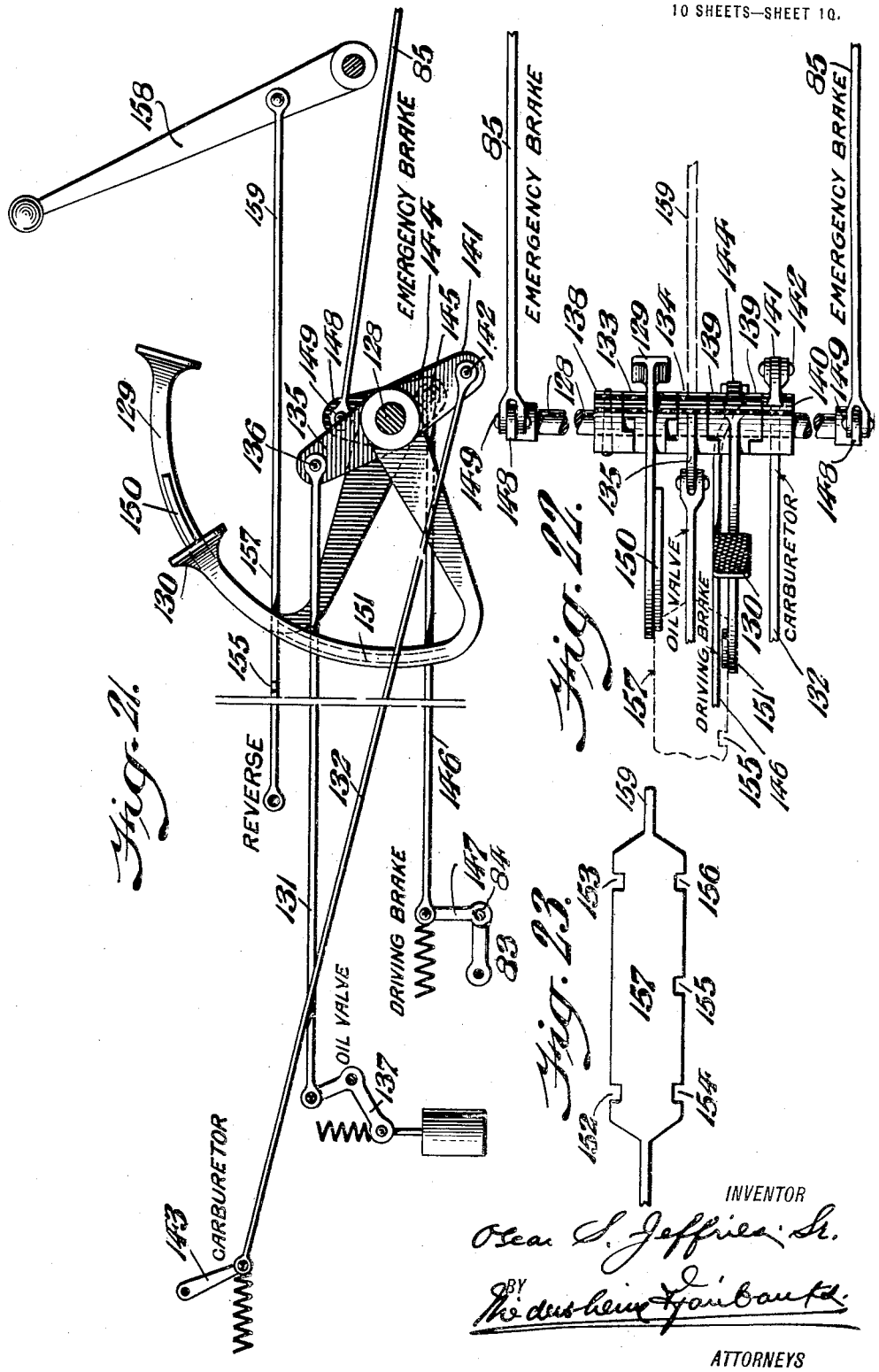

UNITED STATES PATENT OFFICE.

OSCAR S. JEFFRIES, SR., OF PHILADELPHIA, PENNSYLVANIA, ASSIGNOR TO JOSEPH B. MILLER, OF PHILADELPHIA, PENNSYLVANIA.

VARIABLE-SPEED MECHANISM.

1,337,602.      Specification of Letters Patent.      Patented Apr. 20, 1920.

Application filed March 8, 1919. Serial No. 281,557.

*To all whom it may concern:*

Be it known that I, OSCAR S. JEFFRIES, Sr., a citizen of the United States, residing in the city and county of Philadelphia, State of Pennsylvania, have invented a new and useful Variable-Speed Mechanism, of which the following is a specification.

My invention relates more particularly to novel means for connecting the driving and driven shafts of any desired mechanism and although especially adapted to be employed in motor driven vehicles, it is not limited to such use and may be used in all cases where it is advantageous to vary the speed of the driven member with respect to that of the driving member.

With the above in view, my invention in its broad and generic scope comprehends a novel transmission mechanism wherein, in its simplest form, I employ but two gears which are always in mesh, and novel means are provided for controlling one of said gears whereby the driven member can be actuated at any speed between zero and the maximum speed of the driving member.

It further comprehends a novel speed changing mechanism wherein but two gears are employed which are in mesh at all speeds, and novel means are provided for controlling the driving gear to vary the power relationship between the two gears.

It further comprehends a novel construction and arrangement of controlling mechanism wherein a power fluid is utilized to control the driving gear.

It further comprehends a novel construction and arrangement of braking mechanism which is automatically set in operation when the motor which operates the driving shaft is shut off.

It further comprehends a novel construction and arrangement of the driving and driven shafts and novel means for connecting them.

It further comprehends a novel construction and arrangement of reversing mechanism.

It further comprehends a novel construction and arrangement of controlling mechanism wherein a minimum number of parts are employed to control the driving brake, the emergency brake, the fuel system and the lubricating and power fluid, which latter in the embodiment herein shown, represents one type of means for controlling the driving gear.

Other novel features of construction and advantage will hereinafter more fully appear in the detailed description and the appended claims.

For the purpose of illustrating my invention, I have shown in the accompanying drawings a typical embodiment of it which is at present preferred by me, since said embodiment will give in practice satisfactory and reliable results. It is, however, to be understood that the various instrumentalities, of which my invention consists, can be variously arranged and organized, and that my invention is not limited to the precise arrangement and organization of these instrumentalities as herein shown and described.

Figure 1 represents a longitudinal, side elevation of certain of the organic elements of a typical automobile to which my transmission is applied, the transmission being shown in longitudinal, central, sectional elevation as to certain of its members and in side elevation as to others, and an engine of the internal combustion type invented by me and forming the subject-matter of an application for patent filed May 16, 1918, Serial No. 234,967, being illustrated in elevation simply as typifying any engine or motive mechanism as such to which my transmission is applicable. This view shows various typical mechanical controls applicable in the transmission and engine assemblage illustrated more particularly in Figs. 21, 22 and 23.

Fig. 2 represents a central, vertical, longitudinal section of a preferred embodiment of my two-gear variable speed transmission as an entirety.

Fig. 3 represents a transverse section on the line 3—3 of Fig. 2.

Fig. 4 represents a transverse section on the line 4—4 of Fig. 2. Each of the foregoing views illustrates an operative connection or yoke mechanism, that of Fig. 3 being for the control of the pumping and oiling system, and that of Fig. 4 for the control of the reversing gear of the driven shaft.

Fig. 5 represents a section on the dotted line 5—5 of Fig. 2, illustrating more particularly the rack bars and the pinions which control the upper and lower valve which permit the passage of the motive fluid from the pressure chamber into the supply chamber.

Fig. 6 represents a side elevation of the sliding sleeve and rack which are operative in connection with a rack and pinion device for controlling the valves.

Fig. 9 represents a transverse section on line 9—9 of Fig. 2, illustrating, partly covered by a wall plate, the pressure chamber and the supply chamber, with the valve ports between them.

Figs. 10, 11 and 12 illustrate in different positions one of the piston cylinders and pistons, the view illustrating also the mounting of the cylinders for their oscillatory movement.

Fig. 13 represents a section transversely taken on the line 13—13 of Fig. 2, illustrating particularly the driving gear, the driven gear, the counterbalance operative in connection with the driving gear and also the emergency brake band.

Fig. 14 represents in side elevation the driving gear removed from the driven gear, and the counterbalance which is operative with said driving gear.

Fig. 15 represents a central, vertical, side, sectional elevation of the driven gear, its hub and one of the compression disks, taken on the line 15—15 of Fig. 16.

Fig. 16 represents a side elevation of the compression disk illustrated in Fig. 15.

Fig. 17 represents a central, vertical, side sectional elevation of the compression disk which operates in conjunction with the disk represented in Figs. 15 and 16.

Fig. 18 represents a side elevation of the compression disk illustrated in Fig. 17.

Fig. 19 represents, removed from the casing, a part of the driving shaft in elevation, and a part of the driven shaft partly in section and partly in elevation.

Fig. 20 represents a transverse section on the line 20—20 of Fig. 2 of the reversing gear.

Fig. 21 represents in side elevation a typical foot pedal and lever control by means of which my transmission mechanism as an entirety may be employed in connection with the component operative elements of a typical gasolene motor-driven vehicle.

Fig. 22 represents a fragmentary plan of the assemblage of pedals and levers shown in Fig. 21.

Fig. 23 represents a plan of a reversing plate which I use in connection with the pedal system represented in Figs. 21 and 22.

Similar numerals of reference indicate corresponding parts.

Figure 7:
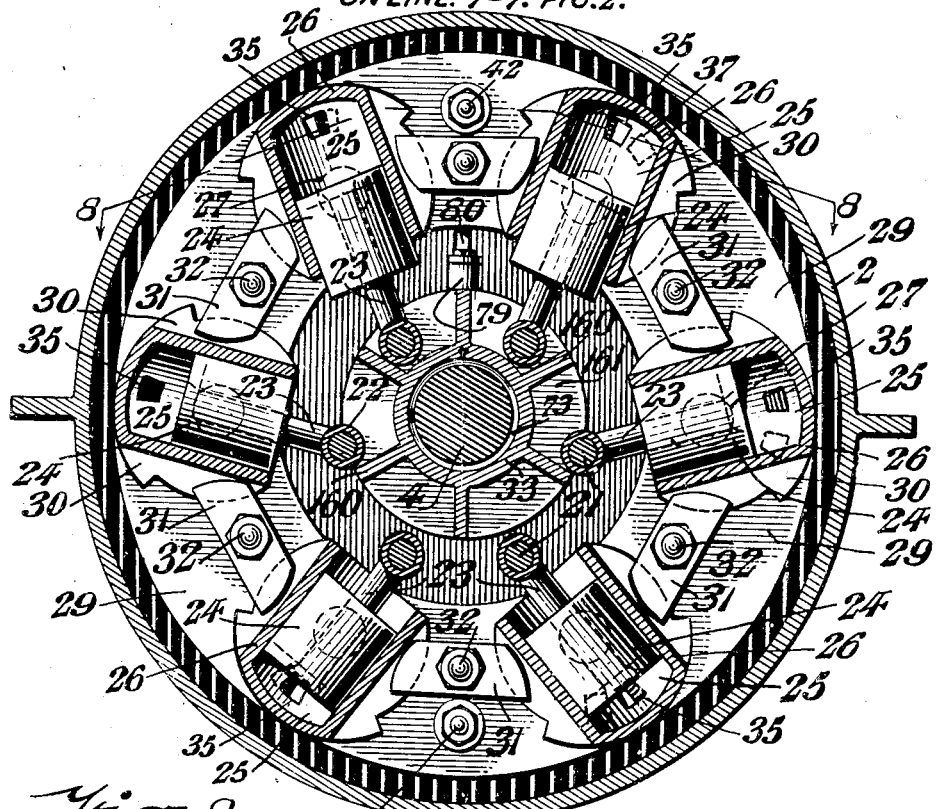
Fig. 7 represents a transverse section on line 7—7 of Fig. 2, illustrating particularly the plurality of piston cylinders and pistons which form a part of the oil supply and control system.

Referring to the drawings.

The present invention in its broad aspect comprises several distinct sets of mechanism which coöperate and are dependent upon each other to produce the ultimate objects or results sought for, and I will therefore describe each of them in detail and, in so far as practicable, in the natural or logical sequence in which they are set in operation.

1 designates a transmission mechanism and its adjuncts embodying my invention, and the parts are preferably assembled in the relationship particularly and best illustrated in Figs. 2, 3, 4, 5, 7, 9, 13 and 20.

*The transmission organically considered.*

Referring to the figures above referred to, 2 designates a sectional casing, preferably cylindric, and adapted to be supported and mounted in any preferred manner in the organization to which it is applied.

In the construction illustrated, the casing is made in two parts or sections, to each of which the reference character 2 is applied, which are provided with flanges 3 bolted or otherwise secured together and which may be packed to render the casing fluid-tight to prevent the leakage of the oil or other fluid medium contained within the casing.

4 designates a driving shaft which is operatively connected with the power or engine shaft to which my transmission is applied. This driving shaft 4 is operatively connected with a driven shaft 5, see Fig. 19, through the intervention of two intermeshing gears 6 and 7 which are always in mesh. The driven shaft is divided for the interposition of a reversing mechanism.

Of these two gears, 6 is the driving gear and 7 is the driven gear.

The driven shaft 5, as will be understood from Figs. 2 and 19, is preferably in axial alinement with the driving shaft 4 and at its ends is recessed as at 8 to adapt it to receive within its recessed portion a reduced end 9 of the driving shaft 4.

10 designates an eccentric integral with or connected to the driving shaft 4, and the driving gear 6 is loosely mounted on said eccentric.

The driven shaft 5 is provided with a left-hand thread 11, Fig. 19, which meshes with a corresponding internal thread 12, Fig. 15, formed within the hub 13 of the driven gear 7.

The driven gear 7, as illustrated, is of the internal gear type so that the driving gear 6 revolves within it, and in view of the fact that the driving gear is mounted eccentrically with respect to the longitudinal axes of both the driving and the driven shaft a large number of the respective teeth of said respective driving and driven gears will always be in mesh, as illustrated in Fig. 13, in one of the possible relative positions of the said two gears, in which twelve teeth of each gear are shown as in mesh with each other. This meshing relationship will be constant irrespective of the relative speeds at which the two gears are driven in the rotation of the driving and the driven shafts.

Inasmuch as the driving gear 6 is, as explained, eccentrically mounted with respect to the driving shaft 4, it is advantageous to counterbalance it and in order to do this, I connect with, or form as an integral part of said driving gear 6, a counterbalance 14, see Figs. 2, 13 and 14.

In the form illustrated, this counterbalance 14 is shown as being separately applied to the driving gear 6 and not integral with it, and as connected to the eccentric 10 by means of a fastening device such as the screw 15, the body portion of said counterbalance having formed upon, or, if desired, secured to it a metal block 16 of the requisite weight, by means of such fastening devices as the screws 17, Fig. 14.

The shape of this block is such that it is disposed and confined within the driving gear 6, as best shown in Fig. 2.

For convenience of manufacture the gear 18 of the driven gear 7 may be made separate from and secured to the body portion of said gear in any desired manner, and a reference to Figs. 2 and 13 will show that the gear ring 18 is secured to the disk 19 of the driven gear 7 by means of fastening devices such as the screws 20.

It having now been explained that the driving gear 6 is loosely mounted on the eccentric 10 on the driving shaft 4, it will be obvious that this driving gear will revolve freely within the driven gear 7 and that no movement will be imparted to said driven gear unless means are employed to establish a predetermined and relatively fixed relation between said driving and said driven gears.

The means which I have selected to illustrate as a convenient means by which I establish this desired relationship between these gears, I have called a controlling mechanism for the driving gear 6, and it comprehends a pumping and oiling system of a novel character which together with the controlling mechanism *per se* I will now describe.

It is to be understood, however, that other forms of controlling mechanism may be substituted for the mechanism illustrated.

*Controlling mechanism for the driving gear.*

Figure 8:
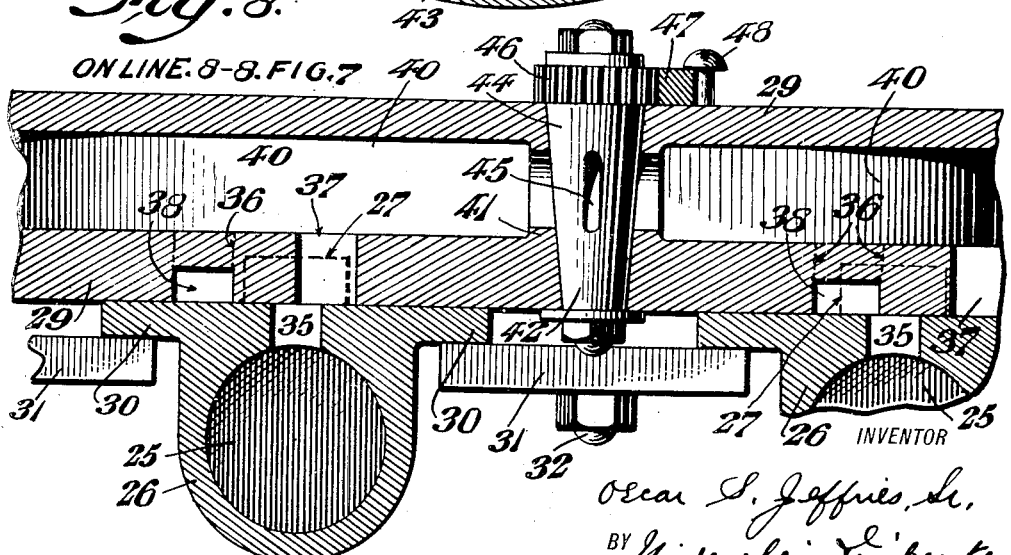
Fig. 8 represents a sectional plan on line 8—8 of Fig. 7, illustrating in enlarged detail one of the valve plugs and the ports between the pressure and exhaust chambers.

Referring now to Figs. 2, 7 and 8, the driving gear 6 has connected to it the stud shafts 21 on which are loosely mounted the hubs 22 of plunger rods 23 which are fixedly connected to pistons 24 which reciprocate within the piston chambers 25 of a plurality of cylinders 26. Any desired number of these cylinders may be employed and the plurality of six particularly illustrated in Fig. 7 may be increased or lessened.

I find, however, that six give good results in practice.

Each piston cylinder 26 is provided with a trunnion 27 shown in dotted lines in both Figs. 7 and 8, and this trunnion is mounted in recessed bearings 28 in the valve casing 29, and may be retained therein in any desired manner.

For purposes of illustration, each cylinder 26 is shown as provided with lateral flanges 30 which are engaged by and with retaining bars 31 which, as shown, are conveniently retained in position by nut-provided threaded rods 32 fixed to the valve casing 29.

A reference to Fig. 7 will indicate that these retaining bars are positioned consecutively of and intermediately between the cylinders 26 and are dimensionally such as not to interfere with the oscillatory movements of the cylinders.

Referring now to the valve casing 29, it will be observed, particularly by a reference to Fig. 2, that said casing is a structure circumferentially disposed with reference to the driving shaft 4, and, in the assemblage illustrated, located near the left-hand end of the casing 2,—which, as will be understood from Figs. 8 and 9, is formed with two peripheral chambers, a feed or supply chamber 39 and a pressure chamber 40 concentric of each other and hereinafter more fully described, and that said casing extends in a steplike central extension which terminates to the right-hand in Fig. 2, in a flange or collar 33 which has a bearing on the driving shaft 4.

The extension of the casing is formed with a recess within which is contained an antifriction device 34, surrounding the driving shaft 4 and serving to permit of the rotary movement relatively to said driving shaft of the valve casing as an entirety and of the assembled piston cylinders connected therewith.

The cylinders and their pistons.

Referring now more particularly to Figs. 7, 8, 9, 10, 11 and 12, it will be seen that each of the piston cylinders 26 is provided near its outer or closed end with a single port 35 which serves both as an inlet and an exhaust port for the motive fluid which passes into and from each piston chamber 25 of each piston cylinder 26.

The valve casing 29 is provided in proximity to each piston cylinder 26 with an admission port 36 and with an exhaust port 37, with both of which in the oscillatory movement of a piston cylinder 26 the single port 35 of each cylinder is adapted to register.

Ports 38 in the valve casing, see Fig. 9, extend between and communicate with both the feed or supply chamber 39 and the pressure chamber 40, already referred to, as within the valve casing 29. The chambers 39 and 40 are separated by a circumferential division wall 41.

In order to control the passage of the oil or other motive fluid from one to the other of the chambers 39 and 40, I provide one or more valves, such as, for example, an upper valve 42, see Figs. 7, 8 and 9, and a lower valve 43. As these two valves are of counterpart construction a description of one of them will be sufficient for both.

Referring now to the upper valve 42, Fig. 8, it, as well as the lower valve 43, is in the form of a conical plug 44 seated in the valve casing and in the form of a one-way valve provided with the port 45 by means of the passage of fluid through which the supply chamber 39 is placed in communication with the pressure chamber 40 at certain times during the rotary movement of the valve casing 29 and piston cylinders 26.

This communication may be primarily controlled by the driving shaft 4 through the following devices.

Referring to Figs. 5, 6 and 8, a pinion 46 is attached exteriorly to each valve plug 44, and these pinions mesh with their respective rack 47, guided in a desired manner for example between the guide pins 48, see Figs. 5 and 8, secured to the valve casing 29, and which at its lower end and upon its side faced right-angular to its upper toothed face which engages with the pinions 46, is similarly toothed to engage with pinions 50, see Fig. 2, which are respectively carried on stud shafts 51 mounted in any desired manner upon the valve casing 29.

These two pinions 50 engage each with a rack 52, Figs. 2 and 6, which is carried by a collar 53 loosely mounted and slidable upon the driving shaft 4, see Figs. 2, 5 and 6.

The collar 53 is provided with an annular groove 54 into which extend the clutch pins 55 of a yoke 56, see Fig. 3, which is mounted upon a rock shaft 57 journaled in a bearing 58, affixed in any desired manner to the left-hand end plate of the casing considered with reference to Fig. 2.

The manner in which the rock shaft 57 is actuated will hereinafter be described in connection with the mechanical means which I prefer to employ for such purpose.

The mounting of the assembled piston cylinders 26 with relation to the driving gear 6, best illustrated in Figs. 2, 7, 10, 11 and 12, is conveniently effected by forming each of the plunger or piston rods 23 at its outer end beyond its cylinder with the right-angularly turned hub 22 through which pass the stud shafts 21. Each stud shaft consists of a pin the outer end of which is threaded to receive a retaining nut and the inner end of which is retained in the wall of the driving gear 6.

The pumping and oiling system.

I preferably employ oil as the power or motive fluid for the pistons and also utilize it as a lubricant for all of the moving parts of the transmission.

61 designates an inlet to the casing which may be seen in Fig. 1, and through this inlet I introduce into the casing such volume of the oil 62 as I desire, and I maintain it under a desired standard of pressure in the supply chamber 39.

The means to which I resort to insure the pressure desired is conveniently the following:—

63 designates an upper sprocket wheel mounted upon the driving shaft 4 externally of the end of the casing 2, which operates through a sprocket chain 64 upon a sprocket wheel 65 mounted on the shaft 66 of a pressure pump 67, the inlet of which from the oil in the casing is designated 68 and the exhaust outlet of which is designated 69 and is an oil tube or conduit leading along beneath the casing to a point where it enters the casing and extends upwardly as a passage 70 through the left standard, see Fig. 2, of two standards which I have respectively designated as 71 and 72.

The passage 70 terminates in an oil groove 73 which extends completely around the hub 13, Fig. 2, of the driven gear 7, and is channeled in a boxing 74 on the top of the left standard 71 so as to insure the desired lubrication.

75 designates a longitudinal channel formed partly in the driving shaft 4 and partly in the driven shaft 5, through which the oil from the groove 73 passes, and which through a radial outlet 76 extends to the internal hub surface of the driving gear 6 to lubricate it, and, further, through the circumferential groove 77 formed in the flange 33 of the valve casing 29 passes to an internal angular conduit 78 formed in a vertical disk member of the stepped extension of the valve casing 29, and, passing through a check valve 79 and an inlet conduit 80, enters the supply chamber 39 within the valve casing 29. The check valve serves to prevent the return of the oil from the supply chamber and therefore maintains it within it until its passage into the pressure chamber 40 necessitates its further automatic supply.

*The brake mechanism.*

Referring now to Figs. 12 and 13 and, incidentally, to Figs. 21 and 22,—81 designates the band of an emergency brake, required by the laws of some States, the inner end of which is locked or fastened at 82 to the casing and which encircles the periphery of the driven gear 7 and at its free end is connected with a lever 83 on a shaft 84, which through a supplemental lever or other connection, not illustrated, is operated through connecting rod 85 to a pedal control by the operator illustrated in Figs. 21, 22 and 23 and hereinafter described.

A further brake control is embodied in the operation of a pair of compression disks 86 and 87, of which the left-hand disk 86 is conveniently formed as an extension of the hub 13 of the driven gear 7, see Figs. 2, 15 and 16, and the right-hand disk is 86, see Figs. 2, 17 and 18. These disks are counterpart and their clamping faces bear oppositely against a fixed disk 88 secured against rotation by a bolt 89 connected with the standards 71 and 72, Fig. 2, the outer faces of which fixed disk 88 are covered with raybestos 90 or other equivalent substance.

91 and 92 respectively represent segmental lugs or clutches, respectively formed and extending from the respective compression disks 86 and 87 to which they are respectively applied, in a manner which will be best understood from Figs. 15 to 18 inclusive. The lug 91 is an extension of the hub 13 of the driven gear 7 and the lug 92 is an extension of the hub 93, Fig. 17, of the disk 87.

When the disks are mounted upon the driven shaft 5, as shown in Fig. 2, the segmental lugs match oppositely and overlap so that they form together a hub support for the internal annular opening 94 of the fixed disk 88, as shown in Fig. 2. The circumferential lengths of the two lugs 91 and 92 are the same but their combined lengths do not constitute a complete circumference in the sense that the hub surface which they form for the internal opening 94 of the fixed disk 88 is not continuous but broken as to a small segmental length, so that there is a limited rotary movement possible for either disk in either direction before the meeting ends of the lugs contact for the purpose of occasioning the rotation of the disks, when in clutched relationship, in either direction.

This rotation is occasioned, as will be easily understood, by the rotation in either direction of the threads 11 on the driven shaft 5, within the matching threads 12 within the hub 13 of the driven gear 7, which causes the rotation of the left compression disk 86,—while the rotation to the extent desired of the right-hand compression disk 87 is occasioned by a key 95 within a keyway 96 in the hub 93, extending also into a keyway 97 in the driven shaft 5, which connects said disk and said shaft.

The mounting and support of the two rotary compression disks 86 and 87 is within bearings 98 and 99 respectively upon the upper end of the standards 71 and 72, as shown in Figs. 1 and 2.

The endwise adjustment of the compression disks with relation to the fixed disk 88 upon the driven shaft 5, is effected by a rotatable adjusting collar 100 internally threaded upon a threaded length 101 of the driven shaft 5, as shown in Fig. 2, and this collar serves also to effect the endwise adjustment of the gears which compose the reversing mechanism hereinafter described, and the assemblage and relationship of the driving gear 6 and the driven gear 7 relative to a shoulder 102 on the driving shaft 4.

The mounting of the elements, which in their assemblage compose my transmission upon the driving shaft and the driven shaft, will now be understood, and the mounting of the driving shaft and driven shaft when socketed together is completed by a ball bearing 103 on the left-hand end plate of the casing 2 which supports the driving shaft, and by a ball bearing 104 on the right-hand end plate of the casing, which, supplementing the support of the bearings 98 and 99 in the standards 71 and 72, supports the driven shaft.

*The reversing mechanism.*

Referring now to Figs. 2 and 20, my reversing mechanism is composed of the following elements:—

104 designates a gear sleeve mounted upon the driven shaft 5 near its outer end, and provided with a radial web 105, the inner face of which, in opposite relation to a circular plate 106, confines an assemblage of toothed pinions 107, 108, 109, 110, 111 and 112, of which the uppermost 107 is in gear with an adjacent pinion 108, while the latter, 108, is in gear with a relatively small central pinion 109 keyed upon the driven shaft 5. The central pinion 109 is in mesh with a laterally disposed pinion 110 in mesh with a lower toothed pinion 111 which latter is in mesh with a relatively large central pinion 112, to the right of the smaller central pinion 109, 112 being keyed by a key 113 to the driven shaft 5, and socketed within the gear sleeve 104 as indicated by 114.

The illustration of Fig. 2 indicates the position of this group of pinions when they are free to reverse, and the devices which effect their locking for direct rotation as contradistinguished from reverse rotation comprehend a group of locking pins 115 which are normally held in sockets 116 longitudinally formed at uniform circumferential distances apart through the gear sleeve 104, and which are adapted to be thrown into an alined group of sockets 117 in the central pinion 112 by the operation of a yoke mechanism particularly illustrated in Fig. 4 and hereinafter described.

The shafts or spindles of the pinions 107, 108, 110 and 111 are most clearly illustrated in Fig. 20, and they extend between the radial web 105 of the gear sleeve 104 and the circular plate 106 in a manner clearly illustrated and such as to make a designation of each shaft numerically unnecessary.

The mounting of the central pinion 109 upon the driven shaft 5 and its keyed connection thereto has been described, and the mounting of the larger central pinion 112 with relation to the gear sleeve 104 has also been described.

The engagement of the teeth of these pinions and gear wheels as a group or assemblage is always constant and such as is particularly represented in Fig. 20, and the movements of rotation which they take on for direct and for reverse are, as stated, due to and controlled by the operation of the locking pins 115, which either lock the gear 112 to the gear sleeve 104 or set it free from said sleeve.

The control and operation of these locking pins is subject to the operation of a rock shaft and yoke device similar to that already described for the control of the worm and attachments which control the movements of the valve plugs between the pressure chamber and the exhaust chamber of the valve casing 29, and of the following construction:—

Referring to Fig. 4, 118 designates a rock shaft journaled in a bearing 119 affixed in any desired manner to the right-hand end plate of the casing considered with reference to Fig. 2, or to a plate 120 mounted upon said end plate. Attached to the rock shaft so as to swing with relation to said shaft as a fulcrum, is a yoke 121, clutch pins 122 of which are entered within a peripheral groove 123 of a sliding collar 124 which surrounds the gear sleeve 104 and is connected with the locking pins 115 by fastenings 125, as best seen in Fig. 4.

The throw of the rock shaft 118 is accomplished by the deflection of a lever 126 connected with the pedal control of the transmission as a whole, which I will now describe.

*Mechanical control of the transmission mechanism and its adjuncts.*

Referring now more particularly to Figs. 1, 21, 22 and 23, the following is a convenient pedal-operated mechanism through which the carbureter 127, Fig. 1, the pumping and oiling system supply, a driving brake of any typical character, and an emergency brake, can be operated by the foot of the operator although as is apparent other types of controlling means may be employed.

128, Figs. 21 and 22, designates a treadle shaft transversely mounted within whatever character of motor vehicle my transmission as an entirety may be applied to, upon which shaft are mounted the hubs of two curved treadles one of which I have designated 129 and the other 130.

These treadles are curved as best shown in Fig. 21, and are preferably similar in shape, 129 being adapted to control the oil valve through suitable connection 131, and 130, similarly through a suitable connection 132, being adapted to control the carbureter.

These two connected controls are effected, first, by mounting the foot treadle 129 upon a notched hub 133 rotatable on the treadle shaft 128, which is adapted to engage with an opposite counterpart notched hub 134, also rotatable on the shaft 128 and provided with an arm 135 extending radially upward from it to a pivotal connection 136 to the connecting rod 131 of the oil valve bell-crank 137, typically indicated in Fig. 21, the notched hub 133 being controlled as to its rotary movement on the shaft 128 by a notched collar 138 fixed on said shaft,—and, second, by mounting the foot treadle 130 upon a notched hub 139 also rotatable on the treadle shaft 128, which is adapted to engage with an opposite counterpart notched hub 140, also mounted on the treadle shaft 128 and provided with an arm 141 extending radially downward to a pivotal connection 142 to the connecting rod 132 of the carbureter connection 143 typically indicated in Fig. 21.

Connected with the notched hub 139 upon the opposite side from that of its notched connection with the notched hub 134, and depending from said hub 139, is another arm 144 which is pivotally connected at 145 to a connection 146 or rod extending to a bell-crank device 147, typically indicated in Fig. 21 as connected with the driving brake.

As will be observed, this assemblage of rotatable side-face-notched hubs 133, 134, 139 and 140, although rotatable, have no endwise movement, on the treadle shaft 128, and, therefore, their oppositely disposed notches have a calculated matching relationship to prevent excessive throws of the foot treadles 129 and 130 and of the arms 135, 141 and 144.

As already mentioned, the connecting rods designated 85 control the emergency brake, and these rods are each themselves controlled by arms 148, each mounted fixedly and in the desired position upon opposite ends of the treadle shaft 128, and each pivotally connected at 149 to said connecting rods 85.

The disposition or placement rotatively considered of the collar 138 on the treadle shaft 128 is such as the judgment of the constructor may adopt to occasion the matching contact of the respective side-face notched hubs of the notched assemblage of hubs, in such positions, respectively considered, as the respective throws of the foot treadles 129 and 130, and of the arms 135, 141 and 144, may indicate and require.

A further control of the throw of the foot treadles 129 and 130 is accomplished by mounting upon the respective inside faces of said treadles laterally extending curved treadle ribs, of given and calculated lengths,—150 being that on treadle 129, and 151 that on treadle 130.

These ribs corresponding to the curvature of the foot treadles themselves, are adapted to travel through notches 152 and 153 and through notches 154, 155 and 156 upon the respective opposite sides of a reversing plate 157, suitably mounted for longitudinal reciprocation within the framework of the machine and controlled in its movement by and connected with a lever 158, itself connected with the reversing gear.

It will be seen from Figs. 2, 7 and 9 that the valve casing is provided with a series of ribs 160 which conform in number to the number of plunger rods, and these ribs form pockets 161 in which are located the hubs 22 of the plunger rods 23 and the connection between such rods and the driving gear. The purpose of these pockets is to retain the driving gear at all times in proper relation to the valve casing. Limited relative movement is permitted between the valve casing and the plunger rods and the range of such movement is limited by the ribs 160 which form the side walls of the pockets 161.

The operation of my novel transmission will now be readily apparent to those skilled in the art to which this invention appertains and is as follows:—

It will be apparent that when the driving gear 6 is locked with respect to the driven gear 7, the driving shaft 4 and the driven shaft 5 will rotate in unison and at the same speed, or in other words, the driven shaft will be driven at a maximum speed and at the same speed as the speed of rotation of the driving shaft.

It will also be seen that when the driving gear is not controlled and revolves freely within the driven gear, the driven gear will not rotate and the driven shaft will remain stationary.

The speed ratio between the driving and driven gears is caused by retarding the speed of rotation of the driving gear, and this can be accomplished in many different ways and by a variety of different constructions too numerous to herein specifically describe.

In order to illustrate one manner of accomplishing this change of speed, I have preferred to show fluid pressure means to control the driving gear. As best seen in Fig. 2, I employ as the motive fluid to control the driving gear a lubricant, such as oil, which is contained within the casing of the transmission and communicates with a pump 3 driven in any desired manner, and as illustrated, the pump is operatively connected with the driving shaft 4 to be driven by it. The pump 3, which is conventionally illustrated as of the rotary type, causes the motive fluid to pass from the casing 2 through the passages 69 and 70 to the oil groove 73, thence through the oil grooves 75 to the groove 77, and thence through the passage 78 and inlet conduit 80 into the supply chamber 39 of the controlling mechanism for the driving gear.

The check valve 79 seen in Fig. 2 prevents the backward flow of the oil, as is evident. The operator, by proper actuation of the rock shaft 57, causes the longitudinal movement of the rack member 52, thereby imparting a partial rotation to the pinions 50 and since these pinions 50 are in mesh with the racks 47 the pinions 46 are partially rotated thereby effecting the partial rotation of the controlling valves 42 and 43 to permit the motive fluid to pass from the supply chamber 39 through the ports 36 and 38 and ports 35 into the piston chambers 25 in rear of the piston 24 therein, see more particularly Figs. 7 to 12 inclusive. This motive fluid in rear of the pistons opposes the outward movement of the different pistons and since these pistons are directly connected to the driving gear, the speed of rotation of the driving gear is reduced, it being remembered that the driving gear is loosely mounted on the eccentric 10 carried by the driving shaft 4. It will thus be seen that, if sufficient pressure is exerted against the outward end of the pistons to prevent relative rotation of the driving gear with respect to the driven gear, the driven gear or driven shaft will rotate at maximum speed.

If the pistons 24 are not opposed in their outward movement by the motive fluid, then the driving gear, as is apparent, will revolve freely within the driven gear and no motion will be imparted to the driven gear or to the driven shaft connected with it.

It will thus be seen that by the proper actuation of the valves 42 and 43 any desired speed ratio between the driving and driven shafts may be obtained. The piston cylinders, as explained, are pivotally mounted on the valve casing, and the driving gear to which the pistons are connected is eccentrically mounted with respect to the driving shaft so that the piston cylinders oscillate during the rotation of the driving gear. This will cause the ports 35 communicating with the piston chambers 25 to register at the proper time with the exhaust ports 37, which it will be understood communicate with the pressure chamber 40. The relative pressure in the chambers 39 and 40 is controlled by the valves 42 and 43. If the valves are open and the driving shaft is rotating the oil is forced from one chamber to the other, due to the in and out movement of the piston, and this permits the driving gear to revolve in a direction opposite to the direction of rotation of the driving shaft. When, however, the valves between the two chambers are partially closed, the revolution of the driving gear in the opposite direction from that of the driving shaft is retarded since the passage of oil from the chamber 40 to the chamber 39 is through restricted openings 45. This causes the internal or driven gear to rotate in the same direction as that of the driving shaft.

The speed ratio between the driving and driven shafts is not a fixed quantity. A compensating action takes place, and the valve opening varies in accordance with the speed of the driving shaft and the load on the driven shaft.

Taking up now the automatic mechanical brake, the hub of the driven gear is, as already explained, in threaded engagement with the driven shaft on which it is mounted. This mechanical brake is located between the speed changing mechanism and the reversing gears and operates automatically. During the operation of the engine and the revolution of the driving shaft 4, the hub of the driven gear due to the left-hand arrangement of the threads tends to unscrew and thereby release the friction disk 86 from its frictional engagement with the stationary disk 88 and the friction members carried by it. It will thus be understood from Figs. 2, 15, 16, 17 and 18 that the driving connection from the driven gear to the driven shaft in the embodiment illustrated is through the hub 13, the driving lugs 91 and 92 and the key 95. When the engine is shut off the momentum of the driven shaft causes the friction disk 86 to tighten or, in other words, to exert a braking action, so that the drag on the engine which ordinarily occurs, when an automobile is going down hill, is eliminated.

In the normal rotation of the hub 13 in a clockwise direction the tendency is to separate the compression disks 86 and 87, the result of which is to automatically release the brake when the automobile, for example, is being driven by the engine. When, however, the car is running down hill its momentum causes the disks to be brought together to overcome the momentum and slow down the car, or, in other words, the rotation of the driven shaft.

Any desired type of reversing mechanism may be employed.

When it is desired to reverse the direction of rotation of the driven shaft 5, the rock shaft 118 is actuated to cause the clutch pins 115 to move into the sockets 117, whereupon the direction of rotation of the driven shaft will be reversed, as is evident.

*The driving brake.*

In order to make a simple and compact construction, I have preferred to illustrate the driving brake as of the band type, see more particularly Figs. 2 and 13. The brake proper consists of the band 81 which encircles the driven gear and has its free end connected to the rock shaft 84, which in turn is connected to the rod 146, so that upon the depression of the treadle 129 the proper braking action will be effected.

*The emergency brake.*

The emergency brake is also controlled by the foot treadle 129, so that upon a further depression of such foot treadle the emergency brake will be effective.

*Vehicle controlling mechanism.*

In order that the manner in which the transmission and its adjuncts are controlled may be readily understood, I have illustrated in Figs. 21, 22 and 23 the vehicle controlling mechanism. The entire movement of the transmission mechanism and its adjuncts may be controlled by the foot treadles 129 and 130 and the reversing lever 158. This leaves the hands of the operator free to control the steering mechanism of the vehicle.

The foot treadles 129 and 130 are provided with side pieces which travel in the notches 153 and 156 respectively of the reverse rod 159, so that such construction acts as a safety device to prevent injury to the reversing mechanism. When the foot treadles 129 and 130 are fully depressed, the ribs 150 and 151 pass beneath their respective notches in the reversing rod 159, and the reversing lever 158 can then be actuated. The foot treadle 130 controls the valves 42 and 43 for the motive fluid and also the carbureter connection 142. The foot treadle 129 controls the driving brake and the emergency brake, and the manner in which these brakes operate at the proper time will be clear from the description already given in the detailed description of the construction seen in Fig. 22.

From the foregoing description, it will be apparent that I have reduced to a minimum the number of parts which it is necessary for the operator to actuate to control the functions of the transmission, the engine which drives it, and the braking mechanism coöperating with the transmission, and which is under the control of the operator.

The entire transmission when running in high gear revolves in a clockwise direction as a unit of structure.

In so far as I am aware, I am the first in the art to employ in a variable speed transmission but two gears which are always in mesh, and wherein means are provided for controlling one of said gears to produce any desired speed ratio between the power shaft and the driven gear or the member driven thereby. I therefore desire to have my claims to such features receive the broad and generic interpretation to which a pioneer invention is entitled.

From the foregoing description, it will be apparent that in accordance with my present invention, I connect the driving and driven members, such as, for example, the driving and driven shafts, by a gear train, which consists of but two gears, which at all times and at all speeds are in mesh with each other, one of said gears, for example, the driving gear, being eccentrically mounted with respect to the axis of rotation of the other gear. The driven gear is preferably of the internal gear type, so that the driving gear can be contained within it as well as the counterbalance for the driving gear which it is preferable to employ, since the driving gear is eccentrically mounted, as before explained.

In the broad and generic scope of my invention, I employ any type of means to retard the rotation of the driving gear during its revolution to vary the speed ratio between the driving shaft and the driven gear or the mechanism driven by the driven gear. This enables me to vary the power of relationship between the driving and driven members.

It is of course to be understood that in many cases arising in practice, the driven gear would be directly and positively connected to the member which it drives, and it is of course within the scope of my invention to have the driven gear fixed with respect to the driven shaft. I have, however, preferred to illustrate my invention in conjunction with an automatically actuated mechanical brake, which forms the connection between the driven gear and the driven shaft, so that it forms in effect a part of the speed changing mechanism between the driving shaft and the driven shaft.

In the broad scope of my invention, any desired means may be employed to maintain a supply of motive fluid in the supply chamber 39 and to maintain such supply of motive fluid in the supply chamber at any desired standard of pressure.

By restricting the passage of motive fluid from the pressure chamber to the supply chamber, I am enabled to maintain any desired resistance to oppose the outward movement of the pistons relatively to the longitudinal axis of the transmission, the pistons being, as before explained, connected to the driving gear.

It will of course be understood that any desired gear ratio between the driving and driven gear may be employed. For convenience of illustration, I have preferred to show a ratio of five to 1, but this is to be understood as conventional only.

By the employment of my present invention, a very compact and simple construction of variable speed transmission may be employed to connect a driving and a driven member, and the number of parts employed is reduced to a minimum.

When a transmission constructed in accordance with my present invention is employed, I am enabled to dispense with the clutch which is necessary in the ordinary types of transmission, and the usual shifting of the gears with the consequent liability to strip the gear is entirely eliminated in my present invention.

In accordance with my present invention, I am enabled to employ as the power or motive fluid, a lubricant such as oil, which serves to lubricate all of the relatively moving parts of the transmission.

It will be seen that when the transmission is operating in high gear, the reversing mechanism, the automatic brake, and the transmission *per se*, are all rotating as a unit of structure. For convenience of illustration, I have shown the pump for the motive fluid as being actuated by the driving shaft, but it will be apparent that this may be driven in any desired manner and that a predetermined standard of pressure of the motive fluid may be maintained in the supply chamber 39 in any desired manner and still be within the broad and generic scope of my invention.

It will now be apparent that I have devised a novel and useful construction of a variable speed transmission, which embodies the features of advantage enumerated as desirable in the statement of the invention and the above description, and while I have, in the present instance, shown and described preferred embodiments thereof which will give in practice satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

1. In a variable speed transmission, a driving shaft, an eccentric driven by it, a driving gear rotatable on said eccentric, a driven gear at all times in mesh with said driving gear, and fluid retarded means to control said driving gear to vary the relative speed of said driving shaft and said driven gear.

2. In a variable speed transmission, a driving shaft, an eccentric driven by it, a driving gear rotatable on said eccentric, a driven gear at all times in mesh with said driving gear, and fluid retarded means to control said driving gear and freely rotatable with it to vary the relative speed of said driving shaft and said driven gear.

3. In a variable speed transmission, a driving shaft, an eccentric driven by it, a driving gear rotatable on said eccentric, a driven gear at all times in mesh with said driving gear, a driven shaft in axial alinement with said driving shaft and on which said driven gear has limited rotation, and fluid retarded means to control said driving gear to vary the relative speed of said driving shaft and said driven gear.

4. In a variable speed transmission, a driving shaft, an eccentric driven by it, a driving gear rotatable on said eccentric, a driven gear at all times in mesh with said driving gear, a driven shaft in axial alinement with said driving shaft and on which said driven gear has limited rotation, and fluid retarded means to control said driving gear to vary the relative speed of said driving shaft and said driven shaft.

5. In a variable speed transmission, a driving shaft, an eccentric driven by it, a driving gear rotatable on said eccentric, a driven gear at all times in mesh with said driving gear and within which said driving gear is contained, and fluid retarded means to control said driving gear to vary the relative speed of said driving shaft and said driven gear.

6. In a variable speed transmission, a driving shaft, an eccentric driven by it, a driving gear rotatable on said eccentric, a driven gear at all times in mesh with said driving gear, a counterbalance contained within said driving gear, and fluid retarded means to control said driving gear to vary the relative speed of said driving shaft and said driven gear.

7. In a variable speed transmission, a driving shaft, an eccentric driven by it, a driving gear rotatable on said eccentric, a driven gear at all times in mesh with said driving gear, and fluid retarded means to retard the revolution of said driving gear during its revolution to vary the power relationship between said driving shaft and said driven gear.

8. In a variable speed transmission, a driving shaft, an eccentric driven by it, a driving gear rotatable on said eccentric, a driven gear at all times in mesh with said driving gear, and manually controlled fluid pressure means to retard the revolution of said driving gear during its revolution to vary the power relationship between said driving shaft and said driven gear.

9. In a variable speed transmission, a driving gear, a driven gear at all times in mesh with it and eccentrically mounted with respect to the axis of rotation of the driven gear, means to drive said driving gear, and fluid pressure means independent of the drive of said driving gear to retard the movement of said driving gear during its revolution.

10. In a variable speed transmission, a driven gear, a driving gear at all times in mesh with it and eccentrically mounted with respect to the axis of rotation of the driven gear, means to drive said driving gear, manually controlled fluid pressure means independent of the drive of said driving gear to retard the movement of said driving gear during its revolution, and means positioned within said driven gear to counterbalance said driving gear.

11. In a variable speed transmission, a driving gear eccentrically mounted, means to rotate said driving gear, a driven gear at all times in mesh with said driving gear, means to control said driving gear to vary the power relationship between said gears, a driven shaft on which said driven gear is loosely mounted, and means to interlock said driven gear with said driven shaft.

12. In a variable speed transmission, a driving gear eccentrically mounted, means to rotate said driving gear, a driven gear at all times in mesh with said driving gear, means to control said driving gear to vary the power relationship between said gears, a driven shaft on which said driven gear is loosely mounted, and means to automatically interlock said driven gear with said driven shaft.

13. In a variable speed transmission, a driving shaft, a driving gear actuated thereby, a driven gear at all times in mesh with said driving gear, a driven shaft on which said driven gear is loosely mounted, means independent of said driving shaft to control said driving gear to vary the speed ratio between said driving shaft and said driven shaft, a member fixed on said driven shaft, and means common to said member and driving gear to effect their interlocking on the rotation of said driven gear in one direction.

14. In a variable speed transmission, a driving shaft, a driving gear actuated thereby, a driven gear at all times in mesh with said driving gear, a driven shaft on which said driven gear is loosely mounted, means independent of said driving shaft to control said driving gear to vary the speed ratio between said driving shaft and said driven gear, a member fixed on said driven shaft, and means common to said member and driving gear to effect their interlocking on the rotation of said driven gear in one direction and to effect their unlocking when the driving gear is ineffective to drive the driven gear.

15. In a variable speed transmission, a driving shaft, a driving gear eccentrically carried by it, a driven gear at all times in mesh with said driving gear, means independent of the driving shaft to retard the revolution of the driving gear to vary the speed ratio between the driving shaft and the driven gear, a driven shaft in threaded engagement with the driven gear, and means to automatically connect said driven gear with respect to said driven shaft to cause them to rotate in unison.

16. In a variable speed transmission, a driving shaft, a driving gear eccentrically carried by it and free to revolve with respect to it, a driven gear at all times in mesh with said driving gear and having a friction disk, a driven shaft on which the driving gear is in threaded engagement, a second disk keyed to said driven shaft, said disks having interlocking means, and a stationary friction device disposed between said disks.

17. In a variable speed transmission, a driving shaft, a driving gear eccentrically carried by it and free to revolve with it, a driven gear at all times in mesh with said driving gear, means independent of said driving shaft to control said driving gear to vary the speed ratio between said driving shaft and driven gear, a driven shaft, said driven gear having a hub in threaded engagement with said driven shaft and being provided with a friction disk and with a driving lug, a second friction disk fixed to said driven shaft and having a lug to engage the lug of said driven gear, and a stationary friction device disposed between said friction disks.

18. In a variable speed transmission, a driving shaft, a driving gear eccentrically carried by it, and free to revolve with respect to it, a driven gear at all times in mesh with said driving gear and having connected to it a friction disk, a driven shaft in threaded engagement with said driven gear, a second friction disk keyed to said driven shaft, a stationary friction member between said disks, means common to said disks to effect their interlocking, and means to effect the relative adjustment of said disks.

19. In a variable speed transmission, a driving shaft, a driving gear eccentrically carried by it and free to revolve on it, a driven gear at all times in mesh with said driving gear, means independent of said driving shaft to control said driving gear to vary the speed ratio between said driving shaft and said driven gear to cause the driven gear to be actuated at any speed between zero and the maximum speed of the driving shaft, and a driven shaft driven by said driven gear.

20. In a variable speed transmission, a driving shaft, a driving gear eccentrically carried by it and rotatable with respect to it, a driven gear at all times in mesh with said driving gear, a driven shaft operatively connected with said driven gear to be driven by it, pistons connected with said driving gear, and means to control admission and exhaust of motive fluid to said pistons to retard the revolution of said driving gear and thereby vary the speed ratio between said driving and driven shafts.

21. In a variable speed transmission, a driving shaft, a driving gear eccentrically carried by it and rotatable with respect to it, a driven gear at all times in mesh with said driving gear, piston cylinders mounted to revolve about said driving shaft and pivotally supported, pistons for said cylinders connected with said driving gear, and means to control the admission and exhaust of motive fluid to said cylinders to control said driving gear and thereby vary the speed ratio between said driving shaft and said driven gear.

22. In a variable speed transmission, a driving shaft, a driving gear eccentrically carried by it and rotatable with respect to it, a driven gear at all times in mesh with said driving gear, a valve casing rotatably mounted, piston cylinders pivotally carried by said casing, pistons in said cylinders connected with said driving gear to control it to thereby vary the speed ratio between said driving shaft and said driven gear, and valve mechanism controlling the pressure conditions within said piston cylinders.

23. In a variable speed transmission, a driving shaft, a driving gear eccentrically carried by it and rotatable with respect to it, a driven gear at all times in mesh with said driving gear, a valve casing rotatably mounted to revolve with said driving gear, piston cylinders movably carried by said valve casing, pistons in said cylinders, rods connected to said pistons and to said driving gear to control it to vary the speed ratio between the driving shaft and the driven gear, said valve casing having admission and exhaust ports in said valve chamber controlled by said piston cylinders to control admission of motive fluid from the valve casing to the cylinders and passage of fluid from the cylinders to the valve casing, and means to control the pressure conditions of the motive fluid in said valve casing.

24. In a variable speed transmission, a driving shaft, a driving gear eccentrically carried by it and rotatable with respect to it, a driven gear at all times in mesh with said driving gear, a valve casing rotatably mounted and having a supply chamber and a pressure chamber, a valve controlling communication between said chambers, cylinders mounted for oscillatory movement on said valve casing and having ports to alternately communicate with said chambers, pistons in said cylinders connected with said driving gear to control it to vary the speed ratio between said driving shaft and said driven gear, and means to control said valve.

25. In a variable speed transmission, a driving shaft, a driving gear eccentrically carried by it and free to revolve with respect to it, a driven gear at all times in mesh with said driving gear, a valve casing rotatably mounted and provided with a division wall forming a supply chamber and a pressure chamber, valves controlling communication between said chambers, cylinders mounted for oscillatory movement on said valve casing, said valve casing having ports common to said chambers and said cylinders to permit motive fluid to pass from said supply chamber to said cylinders and from said cylinders to said pressure chamber, pistons for said cylinders connected with said driving gear, and means to actuate said valves during the rotation of said valve casing.

26. In a variable speed transmission, a driving shaft, a driving gear eccentrically carried by it, a driven gear at all times in mesh with said driving gear, a valve casing rotatably mounted and having a supply and a pressure chamber, cylinders mounted for oscillatory movement on said casing, said valve casing having ports communicating with said chambers and cylinders and controlled by the latter, pistons for said cylinders and connected with said driving gear to control it to vary the power relationship between said gears, and means to feed motive fluid to said supply chamber.

27. In a variable speed transmission, a driving shaft, a driving gear eccentrically carried by it, a driven gear at all times in mesh with said driving gear, a valve casing rotatably mounted and having a supply and a pressure chamber, cylinders mounted for oscillatory movement on said casing, said valve casing having ports communicating with said chambers and cylinders and controlled by the latter, pistons for said cylinders and connected with said driving gear to control it to vary the power relationship between said gears, an inclosing casing containing the motive fluid, and means to feed the motive fluid from said inclosing casing to said supply chamber.

28. In a variable speed transmission, a driving shaft, a driving gear eccentrically carried by it, a driven gear at all times in mesh with said driving gear, a valve casing rotatably mounted and having a supply and a pressure chamber, cylinders mounted for oscillatory movement on said casing, said valve casing having ports communicating with said chambers and cylinders and controlled by the latter, pistons for said cylinders and connected with said driving gear to control it to vary the power relationship between said gears, an inclosing casing containing the motive fluid, and means to feed the motive fluid from said inclosing casing to said supply chamber and prevent the backward flow from said supply chamber.

29. In a variable speed transmission, a driving shaft, a driving gear eccentrically carried by it, a driven gear at all times in mesh with said driving gear, a valve casing rotatably mounted and having a supply and a pressure chamber, valve controlled communication between said chambers, a valve, cylinders mounted for oscillatory movement on said casing, said valve casing having ports communicating with said chambers and cylinders and controlled by the latter, pistons for said cylinders and connected with said driving gear to control it to vary the power relationship between said gears, means to feed motive fluid to said supply chamber, a rack and pinion connection to said valve, and means under the control of the operator to actuate said connection.

30. In a variable speed transmission, a driving shaft, a driving gear eccentrically carried by it and rotatable with respect to it, a driven gear at all times in mesh with said driving gear, a valve casing rotatably mounted and having a supply and a pressure chamber, a valve controlling communication between said chambers, cylinders on said valve casing communicating at all times with one or the other of said chambers, pistons for said cylinders connected with said driving gear, and means carried by said driving shaft to actuate said valves during the rotation of said valve casing.

31. The combination with a driving and a driven member, of speed changing mechanism connecting said members, fluid pressure means controlling said speed changing mechanism, a driving brake for said speed changing mechanism, and means to control said fluid pressure means and said driving brake.

32. The combination with a driving and a driven member, of speed changing mechanism connecting said members, fluid pressure means controlling said speed changing mechanism, a driving brake for said speed changing mechanism, and a member under the control of the operator to control said fluid pressure means and said driving brake.

33. The combination with a driving and a driven member, of speed changing mechanism connecting said members, fluid pressure means controlling said speed changing mechanism, a driving brake for said speed changing mechanism, and a foot treadle to control said fluid pressure means and said driving brake.

34. The combination with an engine, its fuel feeding means, a driving shaft, a driven shaft, speed changing mechanism connecting said shafts, a driving brake for said driven shaft, and a member under the control of the operator to control said fuel feeding means, said speed changing mechanism and said driving brake.

35. The combination with a driving and a driven member, of speed changing mechanism connecting said members, fluid pressure means to control said speed changing mechanism, a driving brake for said speed changing mechanism, means to control said fluid pressure means and said driving brake, and an emergency brake lever under the control of the operator to control said fuel.

36. The combination with a driving and a driven member, of speed changing mechanism connecting said members, fluid pressure means to control said speed changing mechanism, a driving brake for said speed changing mechanism, a member under the control of the operator to control said fluid pressure means and said driving brake, and an emergency brake lever to control said fuel.

37. The combination with a driving and a driven member, of speed changing mechanism connecting said members, fluid pressure means to control said speed changing mechanism, a driving brake for said speed changing mechanism, a member under the control of the operator to control said fluid pressure means and said driving brake, an emergency brake lever to control said fuel, and a reversing lever operative only when said member and said brake lever have been operated.

38. In a variable speed transmission, a driving shaft, a driving gear eccentrically and loosely mounted on it, a driven gear at all times in mesh with said driving gear and means to retard the revolution of said driving gear to cause the driven gear to revolve at any desired speed between zero and the speed of rotation of said driving shaft.

OSCAR S. JEFFRIES, Sr.

Witnesses:
H. S. FAIRBANKS,
J. BONSALL TAYLOR.